United States Patent
Barker

(10) Patent No.: US 8,285,650 B2
(45) Date of Patent: Oct. 9, 2012

(54) METHOD AND APPARATUS FOR BILLING DATA SERVICES

(75) Inventor: Stewart Barker, Bulverde, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 733 days.

(21) Appl. No.: 11/423,882

(22) Filed: Jun. 13, 2006

(65) Prior Publication Data
US 2007/0288366 A1   Dec. 13, 2007

(51) Int. Cl.
*G06F 17/00* (2006.01)
*G06G 7/00* (2006.01)

(52) U.S. Cl. ............ 705/400; 705/40; 705/34; 370/235; 370/486; 370/468

(58) Field of Classification Search ............ 705/34, 705/65, 64, 400; 370/235; 709/245, 223
See application file for complete search history.

(56) References Cited

U.S. PATENT DOCUMENTS

| | | | |
|---|---|---|---|
| 5,828,737 A * | 10/1998 | Sawyer | 379/114.07 |
| 6,085,241 A * | 7/2000 | Otis | 709/223 |
| 6,104,704 A | 8/2000 | Buhler et al. | |
| 6,208,977 B1 * | 3/2001 | Hernandez et al. | 705/34 |
| 6,282,208 B1 * | 8/2001 | Bowcutt et al. | 370/486 |
| 6,591,298 B1 * | 7/2003 | Spicer et al. | 709/224 |
| 6,754,206 B1 | 6/2004 | Nattkemper et al. | |
| 6,775,267 B1 | 8/2004 | Kung et al. | |
| 6,847,613 B2 * | 1/2005 | Mimura et al. | 370/235 |
| 6,925,068 B1 * | 8/2005 | Stanwood et al. | 370/329 |
| 6,961,341 B1 * | 11/2005 | Krishnan | 370/412 |
| 6,968,394 B1 * | 11/2005 | El-Rafie | 709/245 |
| 6,973,033 B1 * | 12/2005 | Chiu et al. | 370/230.1 |
| 7,370,013 B1 * | 5/2008 | Aziz et al. | 705/40 |
| 2001/0037311 A1 * | 11/2001 | McCoy et al. | 705/65 |
| 2003/0014367 A1 * | 1/2003 | Tubinis | 705/64 |
| 2003/0187806 A1 * | 10/2003 | Banerjee et al. | 705/400 |
| 2005/0030907 A1 | 2/2005 | Lou et al. | |
| 2005/0033691 A1 * | 2/2005 | Whewell et al. | 705/40 |
| 2005/0149416 A1 * | 7/2005 | Benco et al. | 705/34 |
| 2005/0157753 A1 * | 7/2005 | Mayer | 370/468 |
| 2005/0164650 A1 * | 7/2005 | Johnson | 455/95 |
| 2005/0195743 A1 * | 9/2005 | Rochberger et al. | 370/235 |
| 2006/0034438 A1 * | 2/2006 | O'Neill | 379/114.07 |
| 2007/0299789 A1 * | 12/2007 | Young | 705/400 |
| 2009/0012885 A1 * | 1/2009 | Cahn | 705/34 |

OTHER PUBLICATIONS

William B. Norton, "Internet Service Providers and Peering," Published May 30, 2001.*
www.isp-planet.com, "Pay for 95 Percent," Published Mar. 12, 2001.*
"Cable and Wireless Cuts off Peering with PSI for Five Days—Both Networks get Low Marks," Published by the Cook Report on Internet, vol. X, No. 5, Aug. 2001.*

(Continued)

*Primary Examiner* — John Hayes
*Assistant Examiner* — Brian Epstein
(74) *Attorney, Agent, or Firm* — Guntin Meles & Gust, PLC; Andrew Gust

(57) ABSTRACT

A method and apparatus for billing data services. A system that incorporates teachings of the present disclosure may include, for example, a system having a controller that manages a communications interface coupled to a communication system. The controller can be programmed to calculate a charge for service according to a degree of asymmetric bandwidth usage of upstream and downstream data traffic consumed by customer premise equipment (CPE). Additional embodiments are disclosed.

14 Claims, 3 Drawing Sheets

OTHER PUBLICATIONS

William B. Norton, "A Business Case for ISP Peering," Published Feb. 19, 2002.*

"Server Colocation & Rack Space Bandwidth Pricing and Bandwidth Costs," www.creativedata.net, Published Feb. 2, 2006.* www.secureconnect.com.au/pricing published Apr. 15, 2004, pp. 1 of 1.*

Altman et. al "Efects on pricing on Internet user Behavior," published by Kluwer Academic Publishers on Jun. 1, 2001, pp. 1-18 of 18.*

* cited by examiner

200

METHOD AND APPARATUS FOR BILLING DATA SERVICES

FIELD OF THE DISCLOSURE

The present disclosure relates generally to billing techniques, and more specifically to a method and apparatus for billing data services.

BACKGROUND

Most Internet users today tend to download more data than they transmit to other computing devices. Consequently, Internet Service Providers (ISPs) have observed an excess in bandwidth for upstream traffic when compared to downstream traffic. As the growth of content providers continues, Tier-1 ISPs are forced to upgrade their network with additional network equipment to keep up with downstream traffic demands.

The asymmetric growth can be costly to Tier-1 ISPs especially in cases where the content providers are not direct customers.

DETAILED DESCRIPTION

Embodiments in accordance with the present disclosure provide a method and apparatus for billing data services.

In a first embodiment of the present disclosure, a computer-readable storage medium in a system that manages billing information in a communication system can have computer instructions for varying a charge for service according to a degree of asymmetry in upstream and downstream data traffic usage associated with customer premise equipment (CPE).

In a second embodiment of the present disclosure, a system can have a controller that manages a communications interface coupled to a communication system. The controller can be programmed to calculate a charge for service according to a degree of asymmetric bandwidth usage of upstream and downstream data traffic consumed by customer premise equipment (CPE).

In a third embodiment of the present disclosure, a method can be used for charging a customer for Internet services according to a degree of asymmetric bandwidth usage of upstream and downstream data traffic in a communication system.

Figure 1:
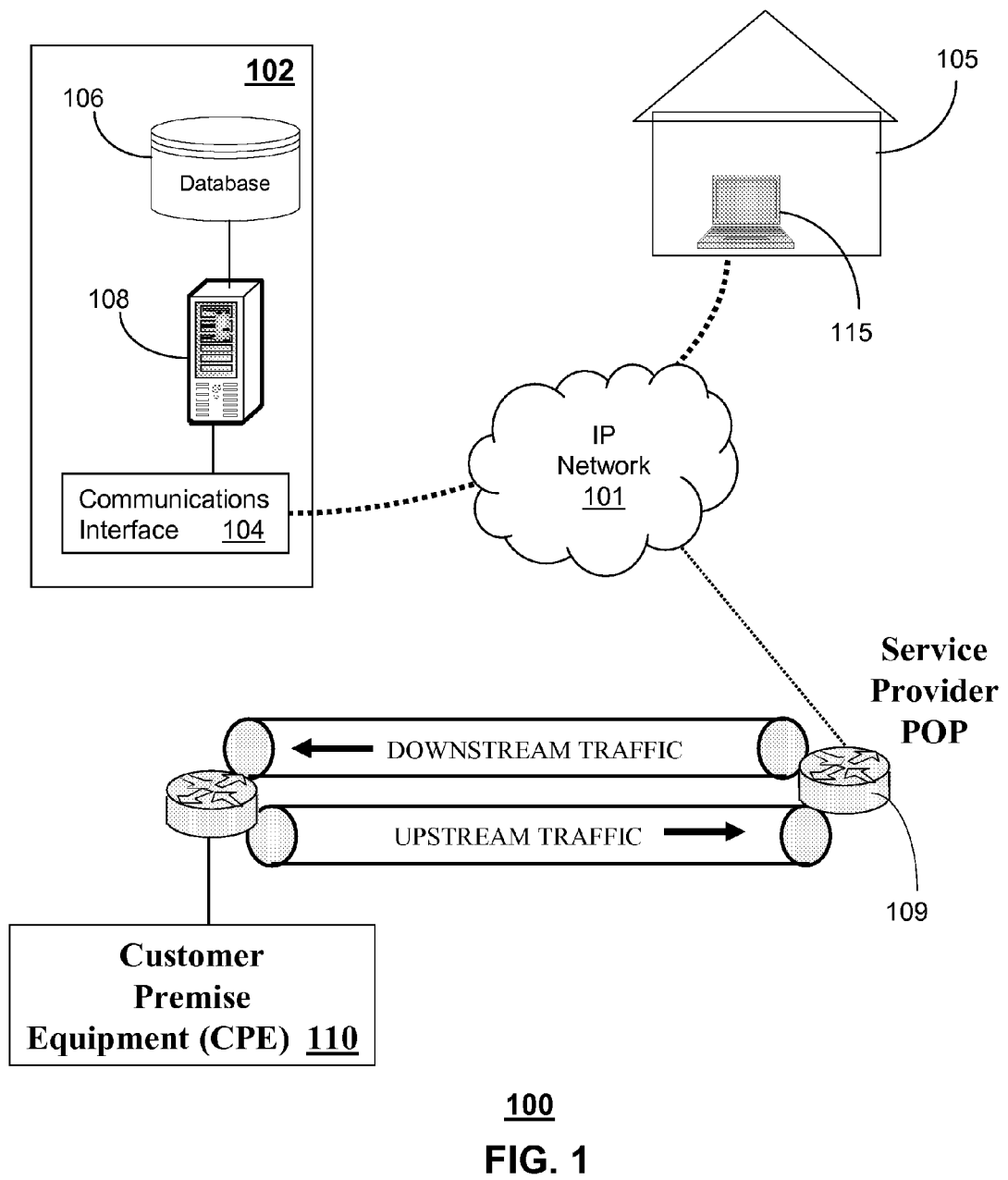
FIG. 1 depicts an exemplary embodiment of a communication system.

FIG. 1 depicts an exemplary embodiment of a communication system 100. The communication system comprises an Internet Protocol (IP) network 101 coupled to a system 102 for managing among other things billing of services rendered to customers, a building 105 housing a computing device 115, and customer premise equipment (CPE) 110. The IP network 101 can be a large expansive communications network (e.g., a Tier-1 ISP) or a localized network. The building 105 can represent a residence or commercial enterprise. The computing device 115 can be coupled to the IP network 101 by way of broadband interfaces such as xDSL (Digital Subscriber Line), cable, or optical interface for supplying Internet services thereto. Dial-up interfaces to the computing device 115 are also possible. Generally speaking, the computing device 115 performs common tasks over the IP network 101 such as intra-office communications, email, content download, and so on.

The CPE can be coupled to the IP network 101 by way of a private dedicated Internet access (DIA) circuit supporting upstream and downstream data traffic. The connection to the IP network 101 can be by way of a common service provider point-of-presence (POP) interface 109. The private DIA circuit can be a copper or fiber interface supporting as much bandwidth as may be required by the CPE 110 (e.g., DS-3 (44 Mbps), OC-3 (155 Mbps), OC-12 (622 Mbps), etc.). The CPE in the present illustration can represent a content provider that leases communication bandwidth from the service provider of the IP network 101 for supplying content to its customers.

The system 102 can represent a billing system which can be combined with other network management functions such as are common with network management systems, customer relations management (CRM) systems, and so on. Accordingly, the system 102 can be designed to process tasks described herein as a centralized computing system, or decentralized computing system in which tasks are dispersed among several computing devices operating in cooperation. For illustration purposes only, system 102 will be referred to herein as billing system 102. The billing system 102 can comprise a memory 106 embodied in this illustration as a database, a communications interface 104 and a controller 108. The communications interface 104 utilizes common communications packet-switched technology for interfacing with the IP network 101. The controller 108 can comprise a scalable server for controlling operations of the billing system 102 as described by the present disclosure.

Figure 2:
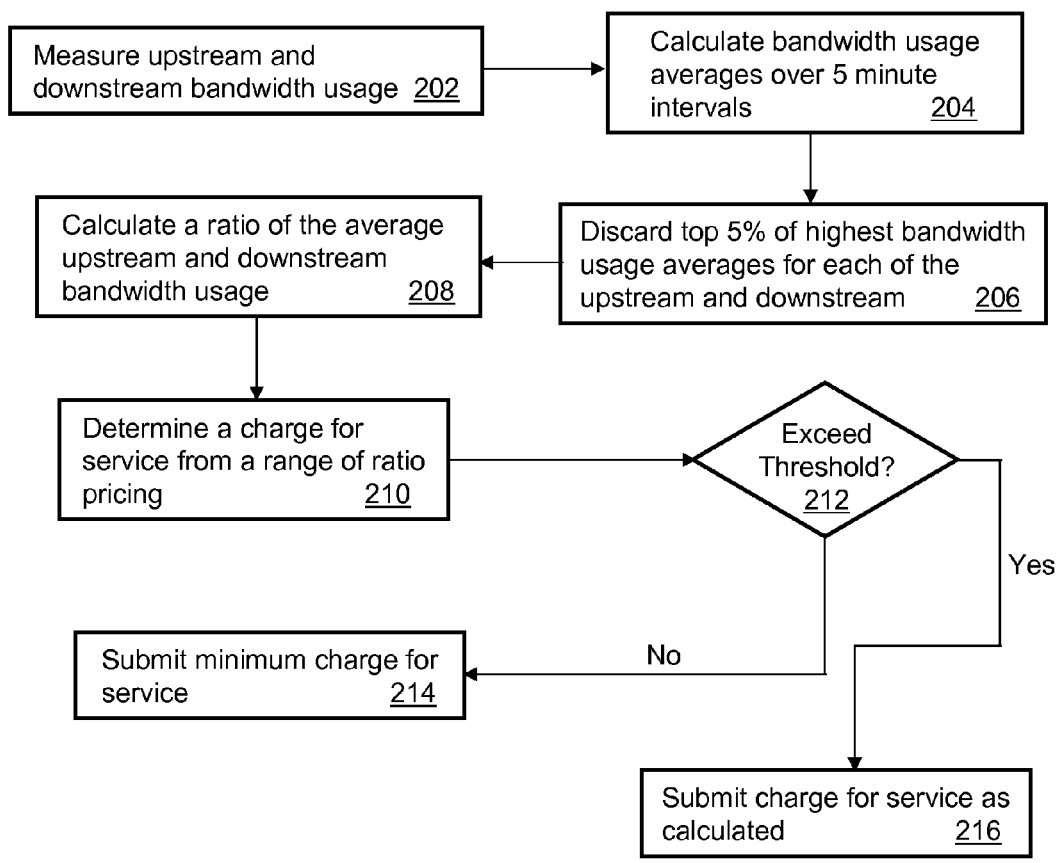
FIG. 2 depicts an exemplary method operating in a billing system of the communication system.

FIG. 2 depicts an exemplary method 200 operating in the billing system 102 of the communication system 100. Method 200 can begin with step 202 in which the controller 108 can be programmed to measure from network elements such as the POP interface 109 upstream and downstream bandwidth usage (in Mega Bits Per Second or Mbps) of the CPE 110. Content providers generally will transmit much more upstream traffic than receive downstream traffic. Accordingly, said measurements can be expected to be asymmetric.

In step 204, the controller 108 can be programmed to calculate the bandwidth for upstream and downstream traffic in a predefined interval such as 5 minutes. Accordingly, for each 5 minute interval the Mbps measurements for upstream traffic will be averaged. Similar 5 minute interval averaging is performed for downstream bandwidth usage measurements. These measurements can continue in 30 day cycles thereby generating 8640 data point averages for each of upstream and downstream traffic. From these data points, the controller 108 can be programmed in step 206 to discard the top 5% highest average points from each of the upstream and downstream averages. The result of step 206 is to create a 95% Mbps averaging technique.

In step 208, the controller 108 can be programmed to calculate a ratio of the average upstream and downstream bandwidth usage from the highest average value points remaining in the upstream and downstream averages. From this ratio, the controller 108 can be programmed in step 210 to determine a charge for service according to a range of ratios. To draw content providers to purchase data services from the IP network 101, the service provider can select a range of ratios that rewards the content provider for asymmetric usage. The reward system can focus on increasing the ratio between upstream and downstream bandwidth. Consequently, the higher the ratio the lower the service provider charges for Mbps usage.

To account for anomalous low bandwidth usage, the service provider can also establish a minimum billing charge threshold by programming the controller 108 to compare the calculated charge for service to a minimum charge for service in step 212. If the calculated charge for service exceeds the minimum charge for service, the controller 108 can proceed to step 216 where it submits an invoice to the content provider managing the CPE 110 that outlines the calculated charge for service. If the minimum charge for service exceeds the calculated charge for service, the controller 108 proceeds to step 214 where an invoice is submitted to the content provider listing the minimum charge for service.

Suppose for example that the content provider leased a private DIA circuit with OC-3 capacity (155 Mbps) from the service provider of the IP network 101. To establish a long-term business relationship with the content provider, the service provider can define three ranges of 95% Mbps asymmetric ratios and a minimum charge with a pricing structure such as follows:

$130 per Mbps based on the greater of upstream and downstream Mbps bandwidth averages having less than a 2:1 ratio $65 per Mbps based on the greater of upstream and downstream Mbps bandwidth averages having greater than or equal to a 2:1 but less than a 3:1 ratio $43 per Mbps based on the greater of upstream and downstream Mbps bandwidth averages having greater than or equal to a 3:1 ratio Minimum monthly billable of $6,045 at 30% of peak bandwidth at the highest per Mbps price (i.e., 30%*155 Mbps*$130)

Assume further that the content provider in a first month has the following usage profile:

Upstream 95% monthly average usage is 145 Mbps
Downstream 95% monthly average usage is 45 Mbps
Upstream to Downstream traffic ratio is >3:1
In this example, the calculated charge is $6,235 ($43*145 Mbps). Since the calculated charge is greater than the minimum charge, the calculated charge is used in the invoice submitted to the content provider.

Suppose that the content provider in the second month of service has the following usage profile:

Upstream 95% monthly average usage is 145 Mbps
Downstream 95% monthly average usage is 65 Mbps
Upstream to Downstream traffic ratio is >2:1 but <3:1
In this example, the calculated charge is $9,425 ($65*145 Mbps). Since this is greater than the minimum charge, the calculated charge is used in the invoice submitted to the content provider.

Suppose that the content provider in the third month of service has the following usage profile:

Upstream 95% monthly average usage is 125 Mbps
Downstream 95% monthly average usage is 65 Mbps
Upstream to Downstream traffic ratio is <2:1
In this example, the calculated charge is $16,250 ($130*125 Mbps). Since this is greater than the minimum charge, the calculated charge is used in the invoice submitted to the content provider.

Suppose that the content provider in the fourth month of service has the following usage profile:

Upstream 95% monthly average usage is 125 Mbps
Downstream 95% monthly average usage is 40 Mbps
Upstream to Downstream traffic ratio is >3:1
In this example, the calculated charge is $5375. Since this is less than the minimum charge, the minimum charge of $6,045 is used in the invoice submitted to the content provider.

The foregoing examples demonstrate a reward system in which the higher the asymmetry between upstream traffic and downstream traffic the lower the charge for service can be. To avoid, excessively low charges that might fall below the operating costs of the service provider of the IP network 101, a minimum charge for service is used. To further illustrate the use of the minimum threshold, suppose that the content provider had in a particular month very low bandwidth usage conditions for both upstream and downstream traffic such as for example an upstream 95% monthly average of 10 Mbps and a downstream 95% monthly average of 3 Mbps. Under these conditions, the ratio would exceed 3:1, however, because of the low bandwidth usage the calculated charge for service would be $430 ($43*10 Mbps) which would likely fall below the operating costs of supplying an OC-3 private DIA circuit. Accordingly, the minimum charge threshold serves to dismiss anomalous low bandwidth usages and thereby maintain the profitability of the service provider.

It would be apparent to an artisan with ordinary skill in the art that other suitable methods for asymmetric pricing are possible. Said artisan would therefore expect that method 200 can be modified, reduced, or enhanced without departing from the scope and spirit of the claims described below. Accordingly, the reader is directed to the claims below for a fuller understanding of the breadth and scope of the present disclosure.

Figure 3:
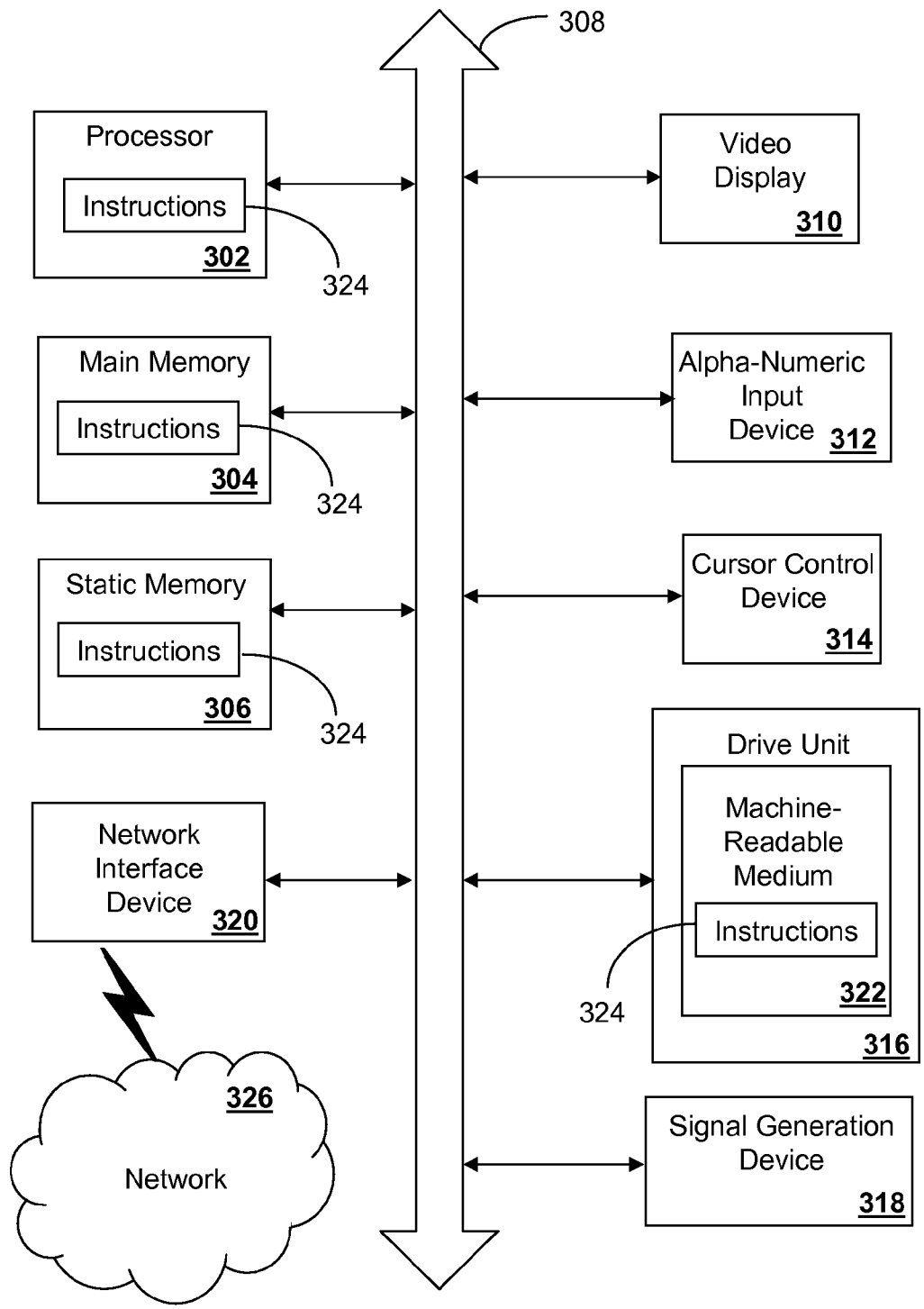
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium comprising computer instructions, that when executed by a computer, causes the computer to perform a method comprising:

calculating upstream and downstream data traffic averages associated with customer premises equipment according to predefined measurement intervals, wherein upstream and downstream data traffic is between the customer premises equipment and network elements of a single service provider;

generating ratios of average upstream data traffic to average downstream data traffic based on the calculated data traffic averages;

calculating a charge for service for a subscriber according to one of a plurality of ranges of asymmetric upstream and downstream data traffic ratios based on the generated ratios, wherein the plurality of ranges of asymmetric upstream and downstream data traffic ratios comprises a first range, a second range and a third range, wherein the first range has a higher ratio of the average upstream data traffic to the average downstream data traffic as compared to the second range, wherein the second range has a higher ratio of the average upstream data traffic to the average downstream data traffic as compared to the third range, wherein each of the plurality of ranges of asymmetric upstream and downstream data traffic ratios has a different price, wherein the first range has a lower price than the second range, and wherein the second range has a lower price than the third range, wherein the charge is calculated by applying the corresponding price of the one of the plurality of ranges to an amount of the upstream data traffic;

replacing the calculated charge for service with a minimum charge for service when the minimum charge for service exceeds the calculated charge for service;

wherein the minimum charge for service is computed from a product of a maximum billing price for data services of the communication system and a percentage of peak service bandwidth provided to the customer premises equipment.

2. The non-transitory computer-readable storage medium of claim 1, wherein the customer premises equipment is connected to the single service provider by a dedicated internet access circuit, wherein the subscriber is a content provider that provides content for download by customers of the content provider.

3. The non-transitory computer-readable storage medium of claim 1, comprising computer instructions for:

discarding a portion of the upstream and downstream data traffic averages; and determining the ratio according a maximum average selected from each of the remaining upstream and downstream data traffic averages.

4. The non-transitory computer-readable storage medium of claim 1, wherein the single service provider is a tier-1 service provider.

5. The non-transitory computer-readable storage medium of claim 1, wherein the upstream and downstream data traffic is measured using a point-of-presence interface.

6. A system, comprising a processor that manages a communications interface coupled to a communication system, wherein the processor is programmed at least to:

calculate a charge for service for a subscriber according to a degree of asymmetric bandwidth usage of upstream and downstream data traffic consumed by customer premise equipment, wherein the upstream and downstream data traffic is between the customer premises equipment and network elements of a single service provider;

calculate averages for upstream and downstream bandwidth usage measurements;

compare the average upstream bandwidth usage to the average downstream bandwidth usage;

determine the charge for service from the comparison of the average upstream bandwidth usage to the average downstream bandwidth usage;

calculate the averages for upstream and downstream bandwidth usage according to predefined intervals;

discard a portion of the highest averages for upstream and downstream bandwidth usage;

compare a maximum average of each of the remaining averages for upstream and downstream bandwidth usage; and adjust the determined charge for service according to prices for ranges of asymmetric bandwidth usage, wherein the ranges of asymmetric bandwidth usage comprise a first range, a second range and a third range, wherein the first range has a higher ratio of average upstream data traffic to average downstream data traffic as compared to the second range, wherein the second range has a higher ratio of average upstream data traffic to average downstream data traffic as compared to the third range, wherein the first range has a lower price than the second range, wherein the second range has a lower price than the third range, and wherein the charge is calculated by applying the corresponding price of a selected one of the ranges to an amount of the upstream data traffic.

7. The system of claim 6, wherein the subscriber is a content provider that provides content for download by customers of the content provider.

8. The system of claim 6, wherein the processor is programmed to replace the calculated charge for service with a minimum charge for service when the minimum charge for service exceeds the calculated charge for service.

9. The system of claim 6, wherein the single service provider is a tier-1 service provider.

10. The system of claim 6, wherein the upstream and downstream data traffic is measured using a point-of-presence interface.

11. A method, comprising:

calculating a charge for a customer for Internet services according to a degree of asymmetric bandwidth usage of upstream and downstream data traffic in a communication system, the charge being calculated by a processor;

charging a subscriber for Internet services according to a plurality of ranges of asymmetric bandwidth usage, wherein the plurality of ranges comprises at least three ranges of asymmetric band usage, wherein the plurality of ranges of asymmetric bandwidth usage comprise a first range, a second range and a third range, wherein the first range has a higher ratio of average upstream data traffic to average downstream data traffic as compared to the second range, wherein the second range has a higher ratio of average upstream data traffic to average downstream data traffic as compared to the third range, wherein the first range has a lower price than the second range, wherein the second range has a lower price than the third range, and wherein the charge is calculated by applying the corresponding price of a selected one of the ranges to an amount of the upstream data traffic;

replacing the calculated charge for service with a minimum charge for service when the minimum charge for service exceeds the calculated charge for service;

wherein the minimum charge for service in the communication system is computed from a product of a maximum billing price for data services of the communication system and a percentage of peak service bandwidth provided to a Customer Premise Equipment, wherein the upstream and downstream data traffic is between the customer premises equipment and network elements of a single service provider.

12. The method of claim 11, wherein the subscriber is a content provider that provides content for download by customers of the content provider.

13. The method of claim 11, wherein the single service provider is a tier-1 service provider.

14. The method of claim 11, wherein the upstream and downstream data traffic is measured using a point-of-presence interface.

* * * * *